US007680875B1

(12) United States Patent
Shopiro et al.

(10) Patent No.: US 7,680,875 B1
(45) Date of Patent: Mar. 16, 2010

(54) MARKERS FOR CACHED OBJECTS

(75) Inventors: Jonathon E. Shopiro, Scotch Plains, NJ (US); Michael D. Scheer, Summit, NJ (US)

(73) Assignee: Novell, Inc., Provo, UT (US)

( * ) Notice: Subject to any disclaimer, the term of this patent is extended or adjusted under 35 U.S.C. 154(b) by 2367 days.

(21) Appl. No.: 10/113,235

(22) Filed: Apr. 1, 2002

(51) Int. Cl.
*G06F 15/16* (2006.01)
*G06F 13/00* (2006.01)
(52) U.S. Cl. .................. 709/200; 711/100
(58) Field of Classification Search ............ 709/200, 709/203, 231; 711/100, 113, 118, 133, 122; 715/513, 540
See application file for complete search history.

(56) References Cited

U.S. PATENT DOCUMENTS

| | | | |
|---|---|---|---|
| 5,608,909 A | | 3/1997 | Atkinson et al. |
| 5,838,965 A | * | 11/1998 | Kavanagh et al. ....... 707/103 R |
| 6,064,406 A | | 5/2000 | Atkinson et al. |
| 6,094,677 A | * | 7/2000 | Capek et al. .............. 709/219 |
| 6,112,231 A | * | 8/2000 | DeSimone et al. ........ 709/213 |
| 6,128,623 A | | 10/2000 | Mattis et al. |
| 6,128,655 A | * | 10/2000 | Fields et al. .............. 709/219 |
| 6,249,844 B1 | * | 6/2001 | Schloss et al. ............ 711/122 |
| 6,272,598 B1 | | 8/2001 | Arlitt et al. |
| 2002/0073084 A1 | * | 6/2002 | Kauffman et al. ......... 707/10 |
| 2003/0004998 A1 | * | 1/2003 | Datta ..................... 707/513 |

FOREIGN PATENT DOCUMENTS

WO    WO 00/31628    6/2000

OTHER PUBLICATIONS

Cooper, et al., Internet Web Replication and Caching Taxonomy, The Internet Society, 2001, http://www.ietf.org/rfc/rfc3040.txt.
Pham, H.T. and Mysore, J., A Framework for Service Personalization, The Internet Society, 2001, http://www.ietf.org/internet-drafts/draft-barbir-opes-fsp-01.txt.

(Continued)

*Primary Examiner*—Benjamin R Bruckart
*Assistant Examiner*—Benjamin Ailes
(74) *Attorney, Agent, or Firm*—Schwegman, Lundberg & Woessner, P.A.

(57) ABSTRACT

Markers are established in a data object to provide a means to refer to specified parts of the object. Each marker is established within the object by giving the location and length of the part of the object that is to be marked. The marker continues to mark that part of the object as changes are made elsewhere in the object. As data is received into the cache computer it is stored in a sequence of buffers. A plurality of filters, all executing concurrently, search for different interesting string in the object. Each filter finds its interesting strings and marks them using the markers. The result of filtering data of the object is a marker attribute table identifying each of the markers by the offset and length of the interesting strings located by the filters. Vend time is the time at which the object is streamed out of the cache to a client computer. Before the data is vended, a User Data Filter (UDF) executes a call function which sets up a string substitution table. The substitution table has entries for substitution, including the offset at which to make the substitution and the string to be substituted into the streaming object. A byte counter tracks the outgoing data stream of the object, and whenever the byte count matches an offset of a marker, the length entry in the marker attribute table determines the length of an omitted string, and the substitute string is placed in the outgoing data stream.

26 Claims, 10 Drawing Sheets

OTHER PUBLICATIONS

Pham, H.T. and Mysore, J., Requirements for an OPES Service Personalization Callout Server, The Internet Society, 2001, http://search.ietf.org/internet-drafts/draft-barbir-opes-spcs-01.txt.

Tomlinson, G. et al., A Model for Open Pluggable Edge Services, The Internet Society, 2001, http://search.ietf.org/internet-drafts/draft-tomlinson-opes.model-01.txt.

Dracinschi Sailer, A. et al., Requirements for OPES Callout Protocols, The Internet Society, 2001, http://search.ietf.org/internet-drafts/draft-dracinschi-opes-callout-requirements-00.txt.

* cited by examiner

OBJECT PROCESSING AT FILL TIME

FILTER CONFIGURATION GENERATED AT SETUP

FIG. 6  FILTER AND BUFFER PROCESSING AT *FILL TIME*

FIG. 9 OBJECT SUBSTITUTION AT VEND TIME

MARKERS FOR CACHED OBJECTS

BACKGROUND OF THE INVENTION

1. Field of the Invention

This invention relates to caching of objects, and more particularly to substituting strings of bytes into an object at vend time as the object is being streamed to a client. The invention is applicable to any software system characterized by fill and vend cycles, where the vended content is some transformation of the filled content. For example, the invention is applicable for one vend, or for many vends, following a fill operation. For example, the invention is applicable to Internet caching, and to any other fill and vend application.

2. Background Information

There are various applications for storing data in a cache, and retrieving the data at a later time, with other data added into the originally cached data. For example, a computer application may cache a web page at a first time referred to as the "fill" time, and retrieve the data at later times referred to as the "vend" times. An example of such an application is the insertion of advertisements appropriate to each user requesting the web page. The basic web page is first cached, then when a user requests the page, the advertisements appropriate for that user are determined and inserted into the web page as it is being vended to the user.

The presently used method is to scan the entire web page, normally written in Hyper Text Markup Language (HTML) each time that the page is vended from the cache. The scan finds the locations within the page where the advertisements are to be placed. The contents of these sections of the page, typically universal resource locator (URLs) for default or dummy advertisements are then replaced by the URLs of advertisements chosen for the requestor.

However, scanning a web page as it is being vended is a wasteful method of inserting external data into the page because the locations where the advertisements, or other data are to be inserted into the web page are always the same each time the page is vended.

There is needed a better method for adding desired data at fixed locations into a cached data stream.

SUMMARY OF THE INVENTION

The invention is to establish markers in an object, where each marker indicates a contiguous section of the object specified by its beginning and length. The markers are saved in a table with the object, and both are saved to persistent storage. The markers can later be used in an operation that replaces the corresponding section of the object with a substitute string.

The invention is implemented by systems programming, and the systems programming provides function calls for an applications programmer to use the invention for any particular application. As an object, for example the file specifying a web page, is received by a cache computer, the operating system provides an alert to the application program. The application program comprises a number of filters which are established to implement a particular application. The purpose of a filter is to scan the incoming data stream of the object, and when an "interesting" string is found by the filter, to create a marker to remember the location of the interesting string in the object. Later, when the object is to be vended to the client computer, the marker can be used to replace the "interesting" string by some other string appropriate to the application.

As data is received into the cache computer it is stored in a sequence of buffers. The length of a buffer is established to conveniently hold one packet of data. The data of the object, that is the file of data referred to as an object, is normally broken into packets. For example, a convenient packet size is one Ethernet packet. In a convenient implementation of the invention, each buffer holds one full size Ethernet packet of data.

There may be a plurality of filters, each scanning for different interesting strings of bytes in the object. Hereinafter a string of bytes will simply be referred to as a "string". Each filter finds its interesting strings, and sets up markers to enable the interesting strings to be replaced at vend time by substitute strings that will be inserted into the outgoing object as it is streamed to a client computer. Filters move from buffer to buffer by gaining ownership of the memory comprising the buffer, and then passing ownership to the next filter, etc.

After the first buffer is filled, the first filter immediately begins to process the data stored in the first buffer. By the time that the first filter is finished with the data of the first buffer, the second buffer may be filled, and the first filter moves immediately to the second buffer. By moving from buffer to buffer, the filter can process the incoming data at about the line speed at which the data arrives at the cache computer. For example, if the filter can do its processing work faster than line speed permits a buffer to be filled by incoming data, the filter will be waiting for the second buffer to finish filling, and so the filter can keep up with the incoming data rate. Otherwise, the next buffer will fill before the filter finishes with the first buffer, and so processing will introduce a delay as the incoming object data streams through the processing of the cache computer.

After the first filter finishes with processing the data in the first buffer, a second filter begins processing the data in the first buffer. After the second filter is finished processing the data of the first buffer, the second filter moves on to the second buffer, and so on. There may be a plurality of filters processing data in a plurality of buffers, and each filter processes concurrently with the other filters. Accordingly, if each filter is faster than the time required to fill a buffer, the data will move through the plurality of filters with only the delay occasioned by loading the buffers, and then emptying the buffers in turn. As a buffer is emptied, after being processed by all of the filters, the data of the object read from that buffer is written into persistent storage. Persistent storage may be a disk, a RAID array of disks, or some other large persistent storage device.

The filters may insert or remove segments of the object (by splitting buffers and adding or deleting buffers) and the markers that have already been created on the object survive. That is, the surviving markers still mark the same interesting string even though the location of the string within the object, (i.e., its offset from the beginning of the object) may have changed since the marker was created. The filters determine the beginning and end of an interesting string, and the marker system software keeps track of, and resolves, any conflict which arises from normal operation of the filters.

A result of filtering data of the object is a marker attribute table identifying each of the markers by the offset and length of the interesting strings located by the filters. The marker attribute table is stored in a convenient location as the data is transferred from buffer to buffer, and may be finally stored in persistent storage with the data of the object. After the object is stored in persistent storage, the offsets and string lengths recorded in the marker attribute table refer to the offsets and string lengths as the data is stored in the persistent storage device.

For a marker created in a buffer, the offset refers initially to the buffer; then, when the subject data are transferred to other buffers owned by the backing store object, the marker software changes the offset to be relative to the start of the object. When a marker is created directly in the backing store object, e.g., by a random access filter, the offset always is relative to the start of the object. When a filter asks the marker software to create a marker (the CREATE call) the filter specifies the buffer and the offset within the buffer. The marker software is responsible for eventually figuring out what the offset should be with respect to the entire object.

In an exemplary embodiment of the invention the marker software is part of the operating system, and filter software is implemented as applications software. That is, the marker software is system software and so provides function calls for the filter software to use. Thus the filter software has an applications program view of events, while the marker software has a system software view of events.

Vend time is the time at which the object is streamed out of the cache to a client computer. In one example, vend time may be substantially the same as fill time, and the object is streamed immediately, before storage in the persistent storage device, to the client computer. In another example, the data may reside for hours, or for days, or for weeks, etc., in the persistent storage device before it is vended to a client computer.

Before the data is vended, a User Data Filter (UDF) executes call functions which set up a string substitution table. The string substitution table is set up by the UDF calling the REPLACE function once for each substitution which the UDF wishes to make. The UDF is an applications program, and the REPLACE function is part of the systems programming. The UDF is an applications program which uses the system program REPLACE calls to generate the replacements desired by the applications programmer.

That is, the filter software decides at vend time which strings to substitute into the object as it is being vended to a client computer. The decision as to which string to substitute into the object may, for example, be made by the filter software testing the header information in the request from the client computer for the object. For example, the IP address of the client computer may be used to select a string known, or supposed, to be of value to a person operating that particular client computer.

The substitution table has entries for substitution, and identifies the markers to be substituted by an object identification and by a marker identification number. Also each entry has the substitute string to be inserted into the object as it is streamed to the client computer, where the substitute strings were provided to the marker software in the REPLACE function issued by the UDF at the beginning of vend time.

A byte counter tracks the outgoing data stream of the object, and whenever the byte count matches an offset of a marker, the length entry in the marker attribute table determines the length of an omitted string, and the substitute string is placed in the outgoing data stream.

Other and further aspects of the present invention will become apparent during the course of the following description and by reference to the accompanying drawings.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
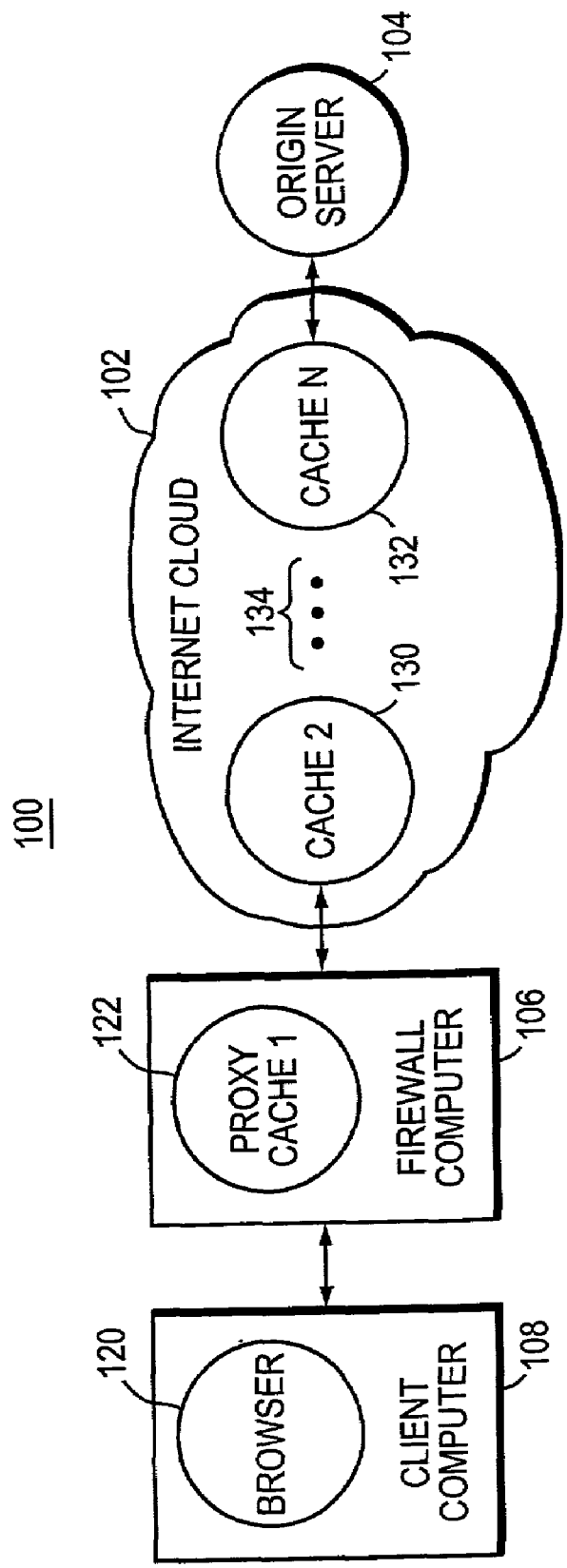
FIG. 1 is a block diagram of a computer network, including the Internet and cache computers.

Turning now to FIG. 1, computer network 100 is shown. Computer network 100 is made up of an Internet cloud 102, an origin server 104 which is outside of the Internet cloud 102, a firewall computer 106, and a client computer 108. In operation, a browser computer program 120 executes in client computer 108. Browser software 120 is commanded by a person using client computer 108, to obtain a file, or document, stored in origin server 104. A message from browser software 120 to origin server 104 is transmitted through firewall computer 106 and then through the Internet cloud 102 to the origin server 104.

The origin server 104, in response to the request to transfer a file to browser 120, transmits the file. The file is transferred through Internet cloud 102 to the client computer 108, where browser program 120 receives the file, and in many cases converts the file into an image which is displayed on a screen of client computer 108 so that the person using client computer 108 can read the file as a document. Frequently, a "web page" is transferred by this method, where a file containing the web page and stored on origin server 104 is transferred to the browser program 120 in client computer 108, so that the web page is displayed on the screen of client computer 108.

Cache computer programs executing in various computers are used to speed up retrieval of files stored on origin server 104. For example, firewall computer 106 may have executing thereon a computer program referred to as a proxy cache 122. In particular, as noted in FIG. 1, proxy cache 1 122 executes on firewall computer 106.

Proxy cache 1 122 operates as follows. Browser program 120 requests a file from origin server 104. The request is intercepted by proxy cache 1 software 122, and proxy cache 1 software 122 checks its storage to determine if the requested file is stored therein. The proxy cache 1 has a "hit" in the event that the requested file is stored therein, and in that event intercepts the request directed to origin server 104 and transfers the requested file to browser software 120. In the event that the requested file is not found by proxy cache 1 software 122 in its storage, then the request is transferred through Internet cloud 102 to origin server 104 where the requested file is located, and transmitted by origin server 104 to browser software 120. As the file transfers from origin server 104 through Internet 102, proxy cache 1 software 122 also receives a copy of the file and stores it in storage facilities utilized by proxy cache 1 software 122. Then, in the event that browser 120 then requests the same file from origin server 104, proxy cache 1 software 122 will have a hit, and will transfer the file from its storage to browser 120. In this second instance, transfer of messaging through Internet cloud 102 to origin server 104 is avoided.

Additional cache computers may be located in Internet cloud 102, for example, cache 2 130 and cache N 132. Three dots 134 indicate that a plurality of cache computers may be utilized within Internet cloud 102. In operation, in the event that there is a miss at proxy cache 1 122, then proxy cache 1 transfers the request from browser 120 to origin server 104. However the address used for origin server 104 is received by cache 2 130. Cache 2 130 has a hit if the requested file is stored in memory of its computer, and has a miss in the event that the requested file is not stored in its memory. In the event that a miss occurs in cache 2 130, the request is transferred again to origin server 104. However the address utilized in the request causes it to be intercepted by another cache, for example cache N 132. Again cache N has a hit in the event that the requested file is stored in its memory, and in the event of a hit cache N 132 transfers the requested file to browser 120. In the event that cache N 132 has a miss, the request is transferred to origin server 104.

Once the request reaches origin server 104, the requested file is located, and is transmitted to browser 120. However, the requested file is received by each of the caches which have looked for it during the transfer of the request to origin server 104, and the requested file is then stored in the memory of each of the caches receiving the requested file. Then, in the next event that browser 120 or some other browser in another client computer (not shown) requests the same file from origin server 104, one of the caches, 122, 130, 132, 134, etc. may still have a copy of the requested file in its memory, and in the event that it does it will have a cache hit, and will transfer the requested file to browser 120.

Use of the proxy caches 122, 130, 132, 134, etc. reduces the number of requests for files received by origin server 104, and so reduces the total amount of work which this server must perform, and also reduces the total Internet data transmission bandwidth. Cache misses occur because the memory available in any cache computer is limited, and more recently cached files may displace an earlier cached file. For example, firewall computer 106 may have a relatively small cache memory, whereas a cache maintained in Internet cloud 102 such as cache 2 130 may have a very large cache memory, and so retain a large number of files which have been recently requested by a browser making use of that cache.

Figure 2:
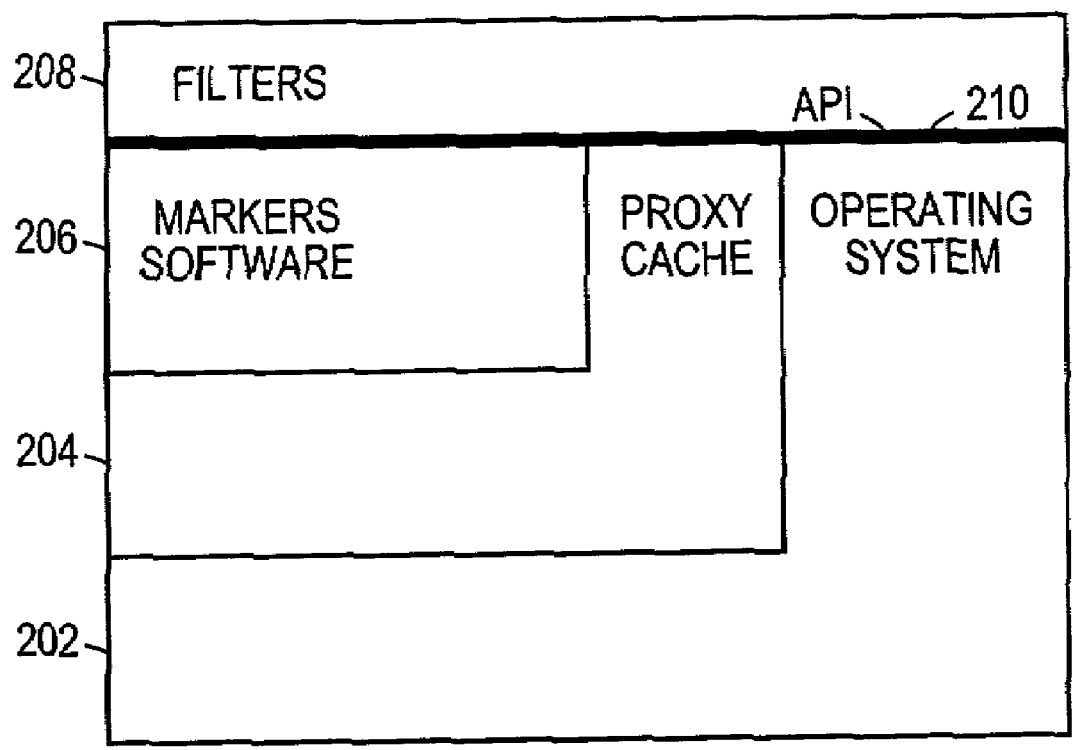
FIG. 2 is a block diagram of a software system for a cache computer.

Turning now to FIG. 2, a representative operating system architecture for use in a cache computer of the present invention is shown. The underlying operating system 202 may be, for example, a Novell NetWare cache operating system, a Unix operating system, a Microsoft NT operating system, etc. Proxy cache 204 represents an operating system extension designed specifically to operate a cache system.

Marker software 206 is a further extension of the operating system of the proxy cache 204. For example, marker software can be regarded as software infrastructure, that is an application building block layered between the operating system and application software. Marker software 204 interoperates with proxy cache 204 as part of the implementation of the present invention. Applications Programming Interface (API) 210, shown as a bold line, separates operating system software from applications software. Filters software 208 is applications software, and interoperates with markers software 206, proxy cache software 204, and operating system 202.

Figure 3:
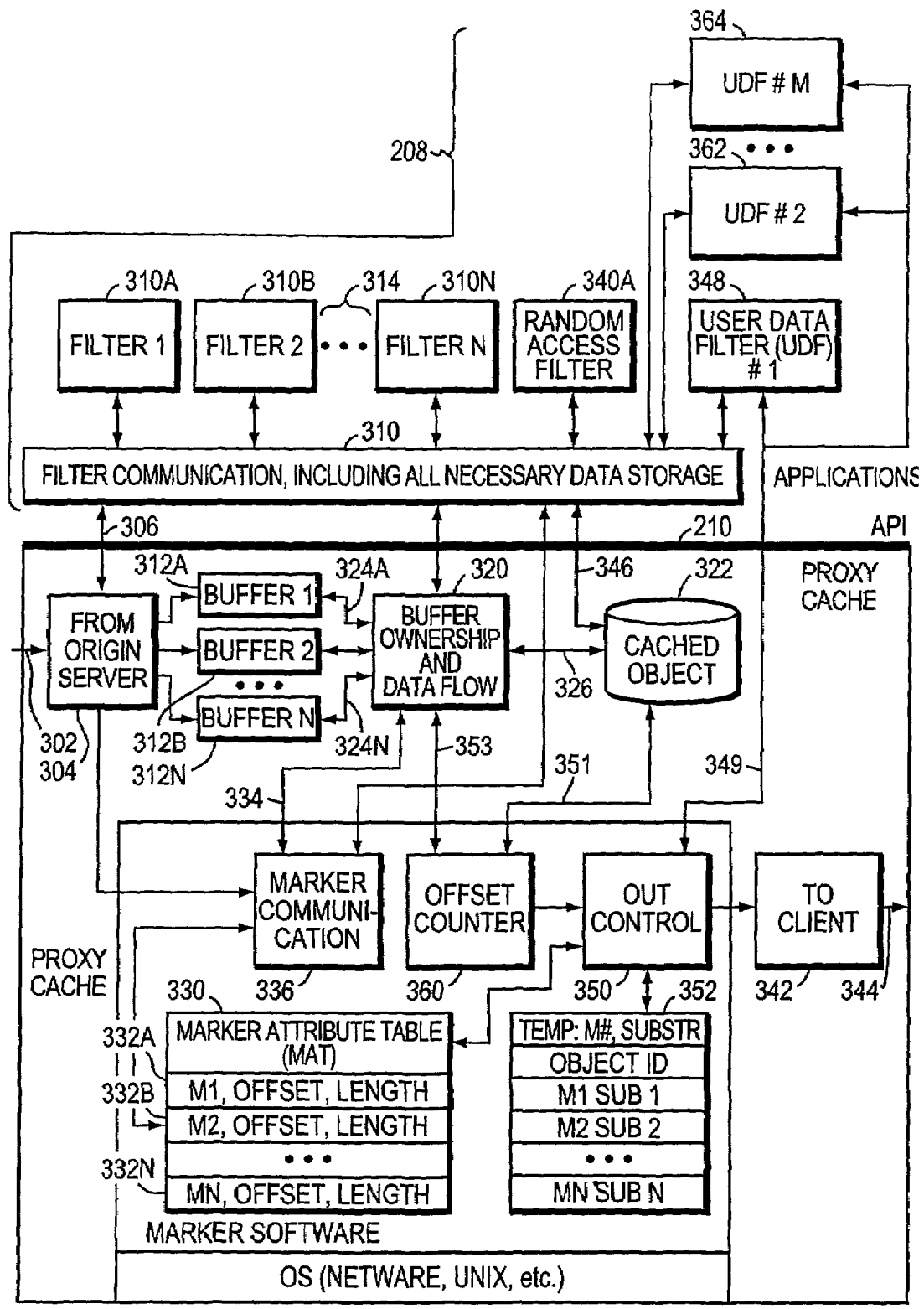
FIG. 3 is a more detailed block diagram of marker software, an operating system, and filter software.

Turning now to FIG. 3, the architecture 300 of markers software 206 and filters software 208 is shown. Applications Programming Interface (API) 210 is shown in FIG. 3 as API 210.

API 210 is shown in bold in both FIG. 2 and FIG. 3. Normally, the division of labor in writing software is that operating system programmers write software shown below API 210, and applications programmers write software shown above API 210. That is, API 210 separates the software programs written by operating system programmers from software written by application programmers, and also defines the "language" in which the application program and operating system communicate.

Application programmers are normally different people from operating system programmers. Operating system programmers normally supply function calls for application programmers to utilize as application programmers write application software.

In an exemplary embodiment of the invention, markers software is written by operating system programmers, and markers software is then utilized by applications programmers to write filter software. The application programmers who write filters software make use of function calls provided by marker software. The function calls are provided by the operating system programmers who wrote the markers software. The invention, in this exemplary embodiment, will be described in terms of filter software using the function calls provided by markers software.

At a time referred to as "fill time", a new file is received by the cache software whose architecture 300 (to be referred to hereinbelow as software 300) is shown in FIG. 3. The new file is received by bytes of the file arriving along line 302. The incoming data stream of bytes of the file first arrive along line 302 at block 304. At block 304 a signal is sent along line 306 to filter software 208, particularly filter communications block 310. Simultaneously to generation of the signal along line 306, blocks of the incoming file are distributed to buffer storage maintained by software 300, with the first bytes being directed by block 304 to buffer 1 312A until buffer 1 is full, then to buffer 2 312B until it is full, and so on as the bytes arrive they are directed to succeeding buffers as earlier buffers fill, with buffer N 312N being the last buffer allocated to the incoming data file.

As soon as buffer 1 312A is filled, and in response to the signal on line 306, ownership of buffer 1 312A is transferred to filter software 208. Filter 1 310A then begins examining the data stored in buffer 1 312A. After filter 1 310A has finished with the data stored in buffer 1 312A, ownership of buffer 1 312A is shifted to filter 2 310B. Also, ownership of buffer 2 312B is shifted to filter 1 310A. Then, simultaneous processing begins, with filter 1 310A examining the data in buffer 2 312B, and filter 2 310B examining the data stored in buffer 1 312A. Similarly, as a first filter finishes examining data stored in a buffer, ownership of the buffer is shifted to the next filter which examines the data in the buffer, while earlier filters have ownership of the next buffer shifted thereto. Three dots 314 indicate that a plurality of filters may be employed in a representative embodiment of the invention. The last filter is indicated as filter N 310N. Finally filter N 310N gains ownership of buffer 1 312A. Filter N 310N then examines the data in buffer 312A.

Further, a filter can receive and retain ownership of several buffers, and hold them for a while, before releasing ownership of any of them to the next filter. When a possible interesting string starts, but is not found entirely within a first buffer, then the filter retains ownership of the first buffer while it scans subsequent buffers for the remainder of the potential interesting string, and also retains ownership of the subsequent buffers. Finally the filter finds an interesting string, or it gives up, and then releases ownership of all of the buffers.

After finishing with the data stored in buffer 312A, last filter 310N releases ownership of buffer 1 312A, and buffer ownership and data flow block 320 begins the transfer of data stored in buffer 1 312A to persistent storage 322, first through line 324A and then through line 326. Persistent storage 322 may be, for example, a magnetic disk. Alternatively, persistent storage may be in a disk farm, may be in a RAID array, or may be in any type of large scale persistent storage.

Once buffer 1 312A is emptied by transfer of its data to persistent storage 322, buffer 312A may be reused to store the next packet of incoming data received along line 302, or for any other purpose.

Ownership of buffer 2 312B then passes to filter N 310N, filter N 310N finishes examining the data stored in buffer 2 312B and releases ownership of buffer 2 312B, and the data stored in buffer 2 312B is transferred to persistent storage 322. The now emptied buffer 312B is now free to accept the next packet of data received along line 302, or to be used by the system in some other way.

A file is examined by all of the filters 310A, 310B, . . . 310N, and is finally stored in persistent storage 322. A long file, with more packets than there are buffers 312A, 312B, . . . 312N, is also examined by all filters. A long file may or may not trigger buffer reuse, but all files are always presented for scanning to all filters in the chain.

Parallel processing is accommodated by the invention during the processing of incoming data. For example, as soon as a buffer is filled, ownership of the buffer is shifted to the first filter, filter 1 310A. As soon as filter 1 310 A examines the data in the first buffer, ownership of the buffer is shifted to the next filter, and filter 1 receives ownership of the next buffer. Thus, as the buffers fill from arriving data packets of the incoming file, they are immediately examined by a first filter, then by a second filter, and so on until the last filter, after which the buffer is emptied by having its data moved to persistent storage 322. Also, focusing on a filter, as soon as the filter finishes examining the data in a buffer, the filter receives ownership of the next buffer, and the filter begins examining the data in the next buffer. Thus, all of the filters can simultaneously examine data in buffers, so that all filters can examine each arriving packet, and can do so at substantially line speed as the data packets arrive through line 302, if the filters do not introduce delay. If a filter can complete its examination of the data in a buffer in less time than required to fill a buffer at line speed, and if there are as many, or more, buffers than there are filters, then the incoming file can be processed, data packet by data packet, at the line speed of its arrival rate on line 302.

When operating system 202 or proxy cache system permits, many processes can proceed simultaneously. For example, many web pages can be vended independently and simultaneously.

We next discuss what a filter does. In a representative embodiment of the invention, a filter looks for "interesting" strings of data in the incoming file. Each filter is programmed to look for its "interesting" string of data. In the event that a filter locates an interesting string in the data stored in a buffer which it is examining, then the filter notes the offset of the beginning of the interesting string from the beginning of the buffer, and notes the length of the interesting string. A filter can continue its determination of the length of an interesting string from a first buffer to the next buffer, that is across a buffer boundary, if the interesting string continues from a first buffer into a next buffer, and so on. After a filter locates an interesting string, the filter issues a CREATE MARKER API call, and in response the marker software 206 creates an entry in a Marker Attribute Table (MAT) 330 and returns the corresponding marker identification number (M number) to the filter. Each marker created in an object has a unique M number. The filter then uses that M number as a name for the string of interest.

The filter software keeps track of each marker by use of its marker identification number, and the filter software has no knowledge of internal operation of marker software 206. Thus applications software engineers have a simple task of handling markers by reference to only the marker identification number, and need not be involved with the complexities of marker software 206.

Entries in the MAT 330 are, the marker identification number, the offset from the beginning of the buffer, and the length of the string. Representative entries in the MAT 330 are shown for various interesting strings, as entry 332A, 332B, . . . 332N, etc. The filters 310A, 310B, . . . 310N transfer the offset and length information through filter communication block 310 along line 334 to marker communication block 336. Marker communication block keeps track of the various offsets and lengths reported by the different filters, and finally computes the proper offsets and lengths to locate the interesting strings as the file is stored in persistent storage 322.

Marker communication block 336 then writes the entries 332A, 332B, . . . 332N into MAT 330, where the entries in MAT 330 indicate the offsets and lengths needed to identify the interesting strings as they are stored in persistent storage 322.

Each filter determines the offset and length of an interesting string relative to the buffer in which the beginning of the string is found. Marker software 206 translates the buffer-relative offset and length into object-relative offset and length. Thus, when the object is written into persistent storage 322, the marker offset and length values are written relative to persistent storage 322. An advantage of each process determining the offset and length relative to the buffer in which the data is currently stored is that none of the application processes need have any knowledge of previous processing of the data.

That is, each filter is isolated from the changes of the others. Each filter needs to know only the offset and length of the data which it is currently looking at. Marker software 206 does all of the work of keeping track of the diverse values of offset and length noted by the various filters, etc.

MAT 330 is stored in persistent storage 322 as part of the stored file of the received data file. And the offset and length values stored in MAT 330 refer to the data as stored in persistent storage 322. By storing the MAT with the data, the marker identification numbers, offsets, and lengths of interesting strings are immediately available with the corresponding data whenever the data is read from persistent storage 322. And the entries in the stored file refer to the data file as it is stored in the persistent storage, and so will refer to the interesting strings as the interesting strings are read out of the persistent storage whenever the file is read from the persistent storage 322.

An advantage of using M numbers (integers) rather than data structure memory addresses as marker identifiers and storing MAT 330 on the persistent storage 322 with the received data file is that the cache and the markers survive a software re-boot, and also survive a loss of electric power to the cache computer, etc. After a power failure or software re-boot, etc., the software simply reads the data file and the MAT 330 from persistent storage. The object is then ready for the next vend request, or is ready to be examined by another random access filter 340A, etc., as described in more detail hereinbelow. The M numbers that were assigned before the shutdown continue to refer to the same markers as they did before the shutdown.

In an alternative embodiment of the invention, the document is vended as it is being received by the cache. Accordingly, the consumer of the file (UDF) is by design unaware of whether the object is read from backing store, or is still being received.

After the data is stored in persistent storage 322, the data may be again examined by a filter, this time referred to as random access filter 340. In an exemplary embodiment of the invention, the stored file is read from the persistent storage into buffers 312A, 312B, . . . 312N, and as the data is stored in successive buffers it is examined by random access filter 340, for example, random access filter 340 examines the data for another interesting string. Also, MAT 330 is read from persistent storage 322, and any new interesting strings are noted, and a new corresponding entry is made to MAT 330. Then, after all of the data has been examined by random access filter 340, MAT 330 is again updated to represent the interesting strings in terms of the offsets and string lengths appropriate to storage of the data file in persistent storage 322. The data and the MAT 330 are then again written into persistent storage 322.

The random access filter 340 may modify the stored data by inserting, removing, or replacing segments of the data. These modifications may cause the offsets of the interesting strings to change. For example, if a section of the stored object near the beginning of the stored object is removed, the offsets of the interesting strings that lie beyond the removed segment in the stored object will each be decreased by the length of the removed segment. The offsets in the MAT are adjusted automatically by the markers software 206 so that they correctly refer to their corresponding strings.

A random access filter can do object modification operations and create markers in any order. For example, a random access filter may modify an object, and then create a marker. Further, there may be more than one random access filter, but they run sequentially; that is, one random access filter completes all its actions before the next begins.

Further, actions of a random access filter may cause an interesting string to be destroyed, for example, the interesting string may be removed. In the event that an interesting string is removed from an object, the corresponding marker is invalidated and the MAT is adjusted accordingly. Markers software 206 keeps the offsets and lengths of interesting strings straight throughout all changes introduced by a random access filter, so that when the filter is finished the MAT 330 offset and length entries will correspond to the current state of the data of the object.

The action of a subsequent filter which changes text marked by an earlier filter is a matter of design choice. In one option, if a string entirely enclosed within a marker changes, then the marker is invalidated. In another option, the marker survives with an appropriate change in length. For example, when markers are used to control text being displayed in a special font, or being used to read text and produce audio, etc., then a marker may be preserved even though a substring within the marked text is changed.

At a time later than fill time, referred to as "vend time", the file stored in persistent storage 322 is read out of persistent storage and is transferred to the client computer, by transmission out of the cache computer through block 342, along line 344. Vend time may be immediately after processing of the first packet of data from buffer 312A, that is substantially simultaneous with arrival of the data packet, or may be much later, for example hours, days or months after storage in persistent storage 322. Further, data written into persistent storage may be vended many times.

At vend time, as data is read out of persistent storage 322, the data passes along line 346 to filter communications block 310 where it may be examined by user data filter (UDF) 348. UDF 348 is marked in box 348 as UDF #1, as the use of a plurality of UDFs is described further hereinbelow. UDF 348 first executes a CALL function to accomplishes two tasks. First, the CALL function causes the marker attribute table 330 to be read from the persistent storage 322 and initialized as an active table in the memory of the processor of the cache computer. Second, the CALL function sets up a temporary substitution table 352 in the marker software. Entries into the substitution table 352 are the marker identification number and the string to be substituted into the outgoing data stream. As the data streams out of the cache computer, the substitute string written into substitution table 352 is inserted into the outgoing data stream, as the string whose length is in the marker attribute table 330 entry is omitted from the outgoing data stream.

The filter software learned the marker identification number for a marker from the return value of the CREATE function and makes it available to the UDF through filter communication block 310. The UDF uses this same marker identification number to deal with markers. The temporary substitution table 352 has entries which are a marker identification number and the string to be substituted, sub1, sub2, . . . subN, etc. into the outgoing stream of data of the object. The entries in the temporary substitution table 352 are in the order in which the substitutions are to be performed; that is, the marker identification number in one entry of the table refers to a marker that precedes the marker referred to by the marker identification number in the next entry of the table.

In an alternative embodiment of the invention, there may be a plurality of User Data Filters, for example UDF 2 362, . . . UDF M 364, etc. In operation, each UDF is executed by filter software as desired, and each UDF builds up its entries in temporary substitution table 352.

As the file data is streaming off persistent storage 322, the streaming file data passes along line 351 to offset counter 360. Offset counter 360 counts the bytes as the data streams past. The data next streams to out control block 350. The out control block steps through the entries in temporary substitution table 352. As the data streams past, out control block 350 compares the byte count with the "offset" value stored in MAT 330 for the marker identification number in the current entry in the substitution table. Whenever the counted bytes match the offset value, then out control 350 omits the number of bytes indicated by the "length" value in the entry in MAT 330 and inserts the substitution string from the current entry in the substitution table. It then steps to the next entry in the substitution table.

The stored object is not changed by the "omission" of bytes from the outgoing data stream. Only the outgoing data is modified.

Substitution table 352 has entries corresponding to each MAT entry for which a substitution is implemented by the UDFs, and the substitution table 352 entries are linked to their corresponding MAT 330 entries by the marker identification number M1, M2, . . . MN, etc. In addition, substitution table 352 contains a substitution string for insertion into the outgoing data stream. That is, the interesting string starting at OFFSET and of length given by the LENGTH entry in the MAT 330 table is omitted from the outgoing byte stream, and the substitution string found in substitution table 352 is substituted therefore. Out control 350 does the omission of the omitted interesting string, and substitutes the substitution string found in substitution table 352 into the outgoing byte stream.

Accordingly, the outgoing byte stream sent by block 342 along line 344 to the client computer has the interesting string found by a filter omitted, and substituted therefore the substitution string found in substitution table 352.

In a first alternative embodiment of the invention, at fill time the object is written to persistent storage, and at vend time the object is then read from persistent storage. At vend time, substitution table 352 is created by UDF 348 calling the REPLACE function for each substitution the UDF wants to make. The UDF finds the marker identification numbers and descriptive information about the markers in filter communication block 310 and determines what substitution, if any, it wants to make for each marker. In the event that UDF decides to make a substitution for a marker, UDF 348 calls the REPLACE function: with the marker identification number M1, M2, . . . MN, etc.; and, the desired substitution string, or a pointer to the desired substitution string, as input parameters to the REPLACE function. In response to the REPLACE function call, marker software 206 creates an entry in temporary substitution table 352, with the entry having the entry identification number and the substitute string, or a pointer to the substitute string.

Offset counter 360 counts the offset of the outgoing data stream, and in the event that a counted offset matches an OFFSET in an entry of MAT 330, then out control 350 checks temporary substitution table 352, and if there is an entry with a matching identification number M1, M2, . . . MN, then the string with the MAT entry OFFSET and LENGTH is omitted from the outgoing object, and the substitute string is read from temporary substitution table 352 and is inserted into the object at the OFFSET.

In operation, the out control 350 starts with the substitution table which is ordered by the offsets of the markers. So out control 350 has to look for one offset at a time. It finds that offset, does the replacement, then gets the next offset.

In a second exemplary embodiment of the invention, the object can be streamed out to a client computer as the object is being received by the cache computer. The object then can be written to persistent storage after the vend operation is completed, or simultaneously with the vend operation. UDF 348 has access to in filter communication block 310 as the object streams along path 353 to offset counter 360. UDF 348 calls the REPLACE function for each entry which it desires to replace, and the REPLACE function creates an entry in temporary substitution table 352 with the entry having the marker identification number M1, M2, . . . MN, etc., and the desired substitute string, sub1, sub2, . . . subN, etc. The entries are created in the order in which the replacements are to occur. Again, offset counter 360 counts the offset of bytes as the object streams through, and when the counted offset matches the OFFSET entry from MAT 330 for the current entry in temporary substitution table 352, the following LENGTH bytes from the incoming data stream are discarded and the substitute string taken from the current entry of temporary substitution table 352 is included in the outgoing byte stream of the outgoing object.

The cached object, the MAT, and information in filter communication block 310 are all written into persistent backing storage in order to save space in main memory and to allow the system to resume operation without loss of information after either an orderly shutdown or a crash. Neither the marker software nor filters control the management of backing store objects. Both know that data in the cache may be written to persistent storage under the control of a different subsystem. The marker software and filters interact with such a subsystem. The marker software cooperates in depositing data in the object (updating offsets, etc.) and also cooperates in streaming it out of the object (making substitutions, etc.). However, as far as the marker software and filters are concerned, the object can be filled, written to and read from backing store, and streamed, all concurrently.

For example, the filter software, written by an applications programmer, may search in a file of a web page for an interesting string indicating an insertion of an animal food advertisement, and this search can be done at fill time. The filter software can then save the marker identification number M1, M2, . . . MN, etc. of the corresponding marker, along with an indication of this knowledge. At vend time the filter software may know that this particular IP address has ordered dog food in the past, and so select a substitute string adding an advertisement for dog food to the web page by UDF 348 at vend time. Alternatively, the particular IP address may indicate that the client computer favors cats, and so the UDF 348 filter software selects a substitute string which inserts an advertisement for cat food into the web page. In this example the substitution table 352 is defined after receipt of the request to vend the file, that is, at vend time. This example shows "on the fly" definition of the substitution string at vend time.

Figure 4:
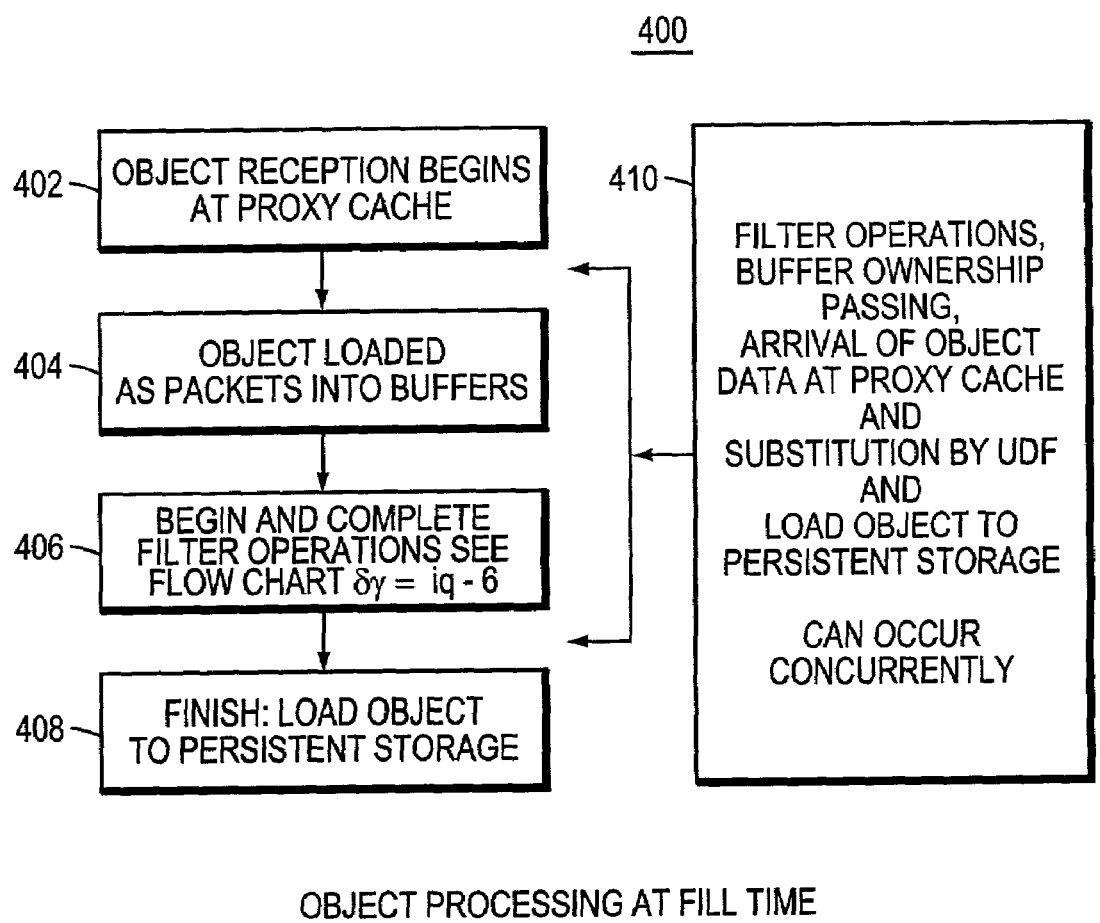
FIG. 4 is a block diagram of a process for concurrent processing by filters of buffered data.

Turning now to FIG. 4, object processing at fill time is illustrated by block diagram 400. Block diagram 400 illustrates concurrent processing of objects at buffers and filters.

The term "object" refers to the file to be processed and stored in persistent storage 322. At block 402 object reception begins at the proxy cache 122, 130, . . . 132, 134, etc., and then the process goes to block 404. At block 404 the object is loaded as packets into buffers 312A, 312B, . . . 312N, etc. From block 404 the process goes to block 406.

At block 406 filter operations commence, both as described with reference to FIG. 3 where concurrent processing was described, and as further shown in the flow chart of FIG. 6. After block 406, the process goes to block 408.

At block 408 the process finishes processing the object. The object, along with MAT 330, are written into persistent storage 322.

Block 410 illustrates transfer of buffer ownership as the various filters 310A, 310B, . . . 310N, etc. examine the data stored in various buffers 312A, 312B, . . . 312N. Block 410 also illustrates the alternative embodiment of the invention, where the object is vended as it arrives at fill time. In this alternative embodiment, vend time is delayed from fill time only by the time interval required for the object to pass through the cache, be examined by the various filters, and then to be immediately vended. The object may be cached or not cached to persistent storage 322, depending upon a decision made by filter software, based on some attribute of the object, etc.

Block diagram 400 illustrates that marker software, through the use of buffers 312A, 312B, . . . 312N, etc., supports concurrent processing of incoming data by a plurality of filters. Further, vend time can be concurrent with fill time by the buffer ownership and data flow block 320 sending the data along path 353 for immediate vending.

Figure 5:
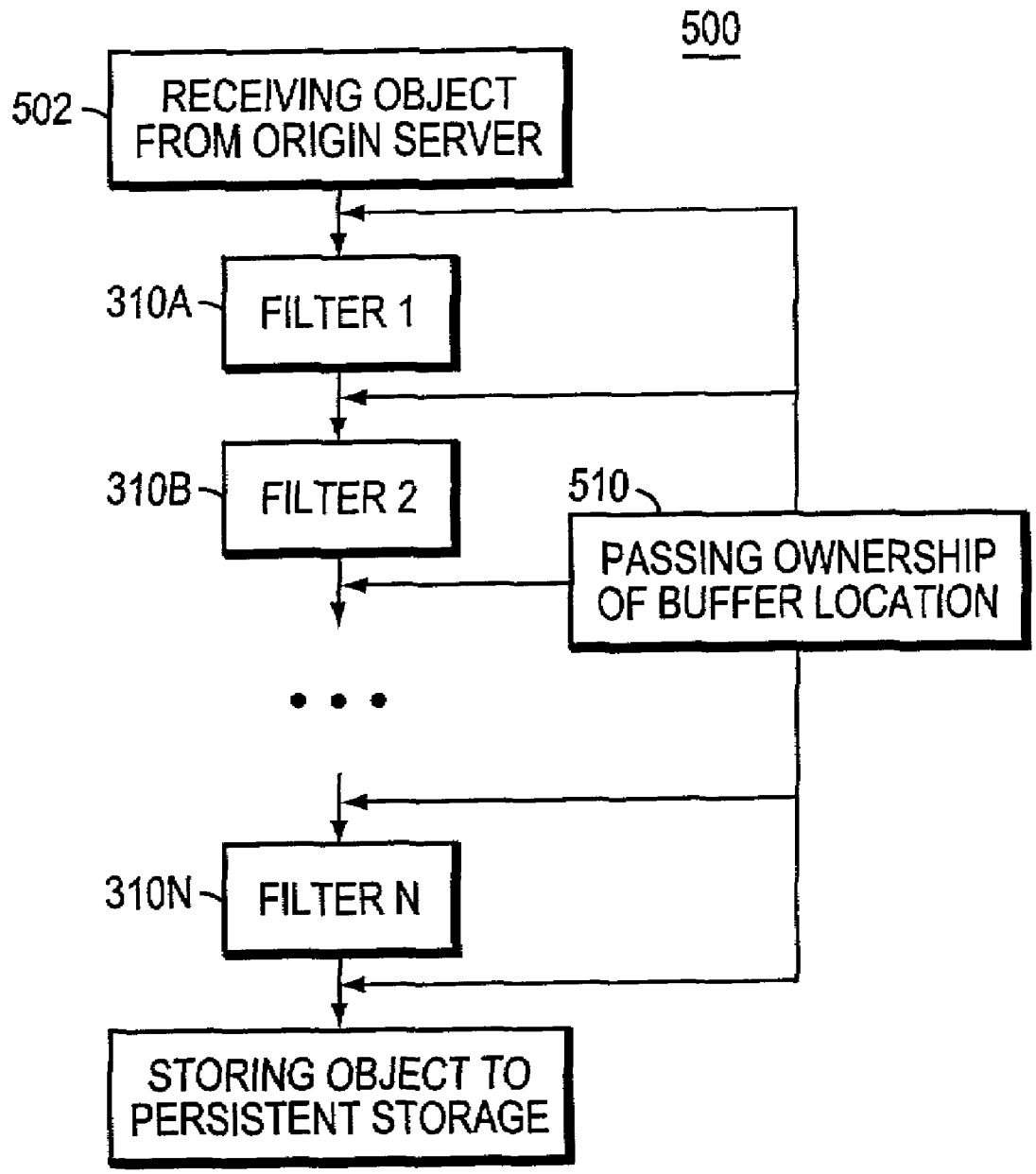
FIG. 5 is a block diagram of a process performing concurrent processing by filters of data stored in buffers.

Turning now to FIG. 5, there is shown flow chart 500. The architecture shown in flow chart 500 is established at setup time, when the filter application software is initialized. At block 502 the object is received from the origin server along line 302. The object then is stored into buffers 310A, 310B, . . . 310N, etc. Block 510 illustrates passing of buffer ownership of the various buffers 312A, 312B, . . . 310N to each filter in succession, as the packets in the buffers are passed from filter to filter.

Figure 6:
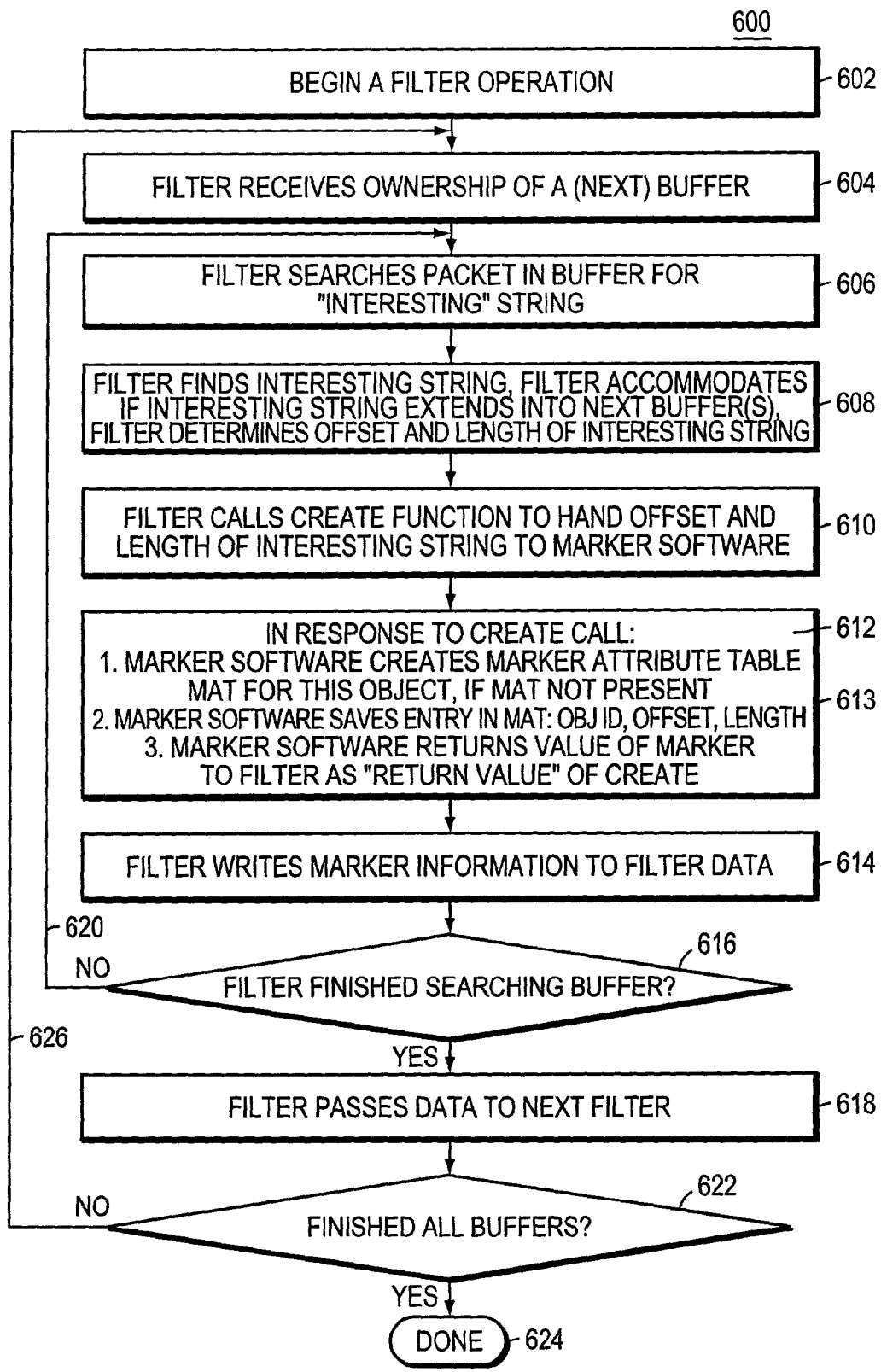
FIG. 6 is a flow chart of filter and buffer processing at fill time.

Turning now to FIG. 6, flow chart of process 600 illustrates filter and buffer processing at fill time. At block 602 the process begins filter operations, after at least one buffer is filled by the incoming file at fill time. From block 602 the process goes to block 604.

At block 604 the filter receives ownership of a buffer holding, either the first data of the first packet of the file, or the data in the next buffer filled as the file was received. From block 604, the process goes to block 606.

At block 606 the filter searches the packet stored in the buffer for an interesting string. From block 606, the process goes to block 608.

At block 608 the process either finds an interesting string, or does not find an interesting string. In the event that the process finds an interesting string at block 608, the process determines the offset and length of the interesting string. If the end of the buffer contains what may be the beginning of an interesting string, the process may wait to receive the next and subsequent buffers to see if a complete interesting string is actually present. Thus, a filter may have ownership of the first buffer which appears to have the beginning of an interesting string, and may have ownership of the next, or next several buffers, in order to determine if the string is in fact interesting. For an interesting string which runs for more than one buffer, the process must properly account for buffer boundary effects. Once the offset and length of the string are determined, the process goes to block 610.

At block 610, the process calls the CREATE function to create a marker for the interesting string. Blocks 602, 604, 606, 608, and 610 are in filter software, that is applications software 208. The CREATE function is a call to operating system software, that is marker software below the API line 210. After the call to CREATE function, the process goes to block 612.

Block 612 has a heavy border 613 to indicate that block 612 is beneath the API line 210 of FIG. 2 and FIG. 3. At block 612 the markers software responds to the CREATE call. In response to the CREATE call, marker software does at least the following.

1. Creates the marker attribute table MAT 330 for this object, if the MAT has not already been created by an earlier CREATE call.

2. Saves an entry into MAT 330, where the entry has the marker identification number, the offset, and the length of the string.

3. Returns a value to the calling filter software, where the return value is the marker identification number of the interesting string. The marker identification number then serves as an identification of the interesting string. Using the return value of the CREATE function call to return the marker identification number to the filter software, permits the operating system software, that is the markers software, to assign the marker identification number to an interesting string, and to easily communicate that number to the filter software.

After the work of block 612 is completed, the marker software returns the CREATE function call to the filter software, and the process goes to block 614.

At block 614 the filter software writes the marker information to "filter data" maintained by the filter software. Methods to define filter data used by applications programmers who write filter software are beyond the scope of this invention. An applications programmer is free to use any convenient method, and the present invention enables him/her to do so, namely the filter communication block 310.

The "filter communication block" contains a "metadata store" that holds a set of name-value pairs and is saved with the persistent data of the object. Name-value pairs are a simple efficient mechanism that makes it easy for different filters to store different information without interfering with each other. The filter saves the marker identification number and whatever descriptive information is appropriate in the metadata where it is available for the UDF to examine.

For example, an applications programmer must have a method for a filter process to communicate with its buddy UDF filter, or filters. After block 614, the process goes to decision block 616.

At decision block 616 the process checks whether the buffer has been fully searched, and in the event that it has, the process goes to block 618. In the event that the buffer has not been fully searched, the process returns along path 620 to block 606. At block 606 the search of the buffer continues.

At block 618, ownership of the buffer is passed to the next filter, or if this was the last filter, the data stored in the buffer is either immediately vended or is prepared for writing to persistent storage 322. After block 618 is finished, the process goes to decision block 622.

At decision block 622 the process checks whether the filter has finished examining data in all buffers. In the event that this buffer is the last buffer, the process goes to block 624 where the process is done. In the alternative event that the present buffer is not the last buffer, the process returns along path 626 to block 604 where the filter receives ownership of the next buffer. The process then repeats for this next buffer.

Figure 7:
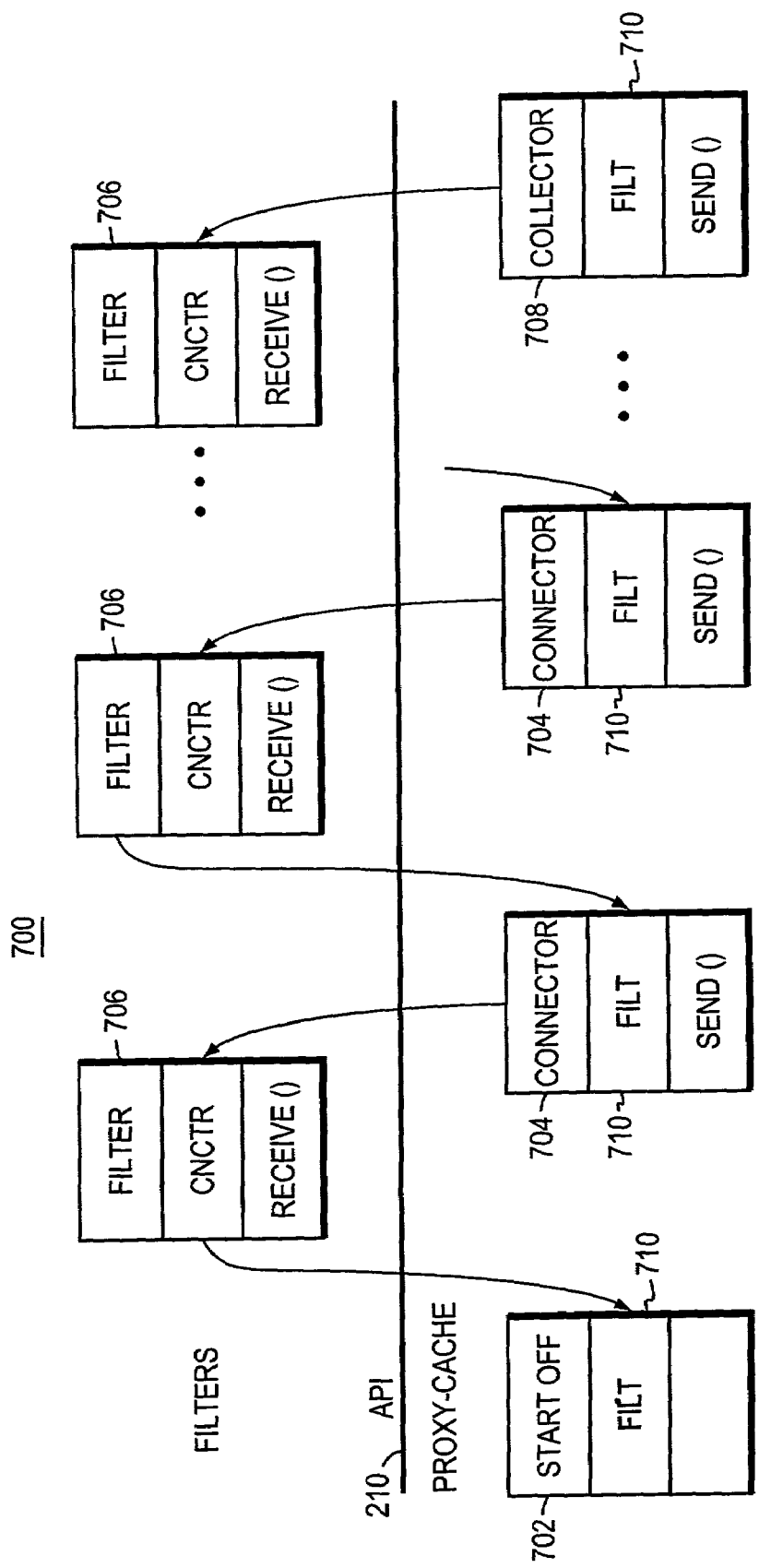
FIG. 7 is a block diagram of software calls to marker software used by a filter as it processes data from a sequence of buffers.

Turning now to FIG. 7, operation of filter software is shown in more detail by a flow diagram 700 showing transfer of buffers between filters.

Four kinds of object are shown in FIG. 7: StartOff 702, Connector 704, Filter 706, and Collector 708. Buffer segments flow between each of the objects shown, by transfer of ownership of the memory used by the buffer.

Filters implement a RECEIVE( ) function. That function is called (by someone outside the filter, for example block 304 "from origin server" when a file first begins to be received, or by a CONNECTOR 704 SEND( ) function) when there is a buffer segment for the filter to process. The buffer segment (for example, a pointer to it) is the argument of the RECEIVE function. In the body of the RECEIVE function the filter does its thing: examining the buffer segment for interesting strings, creating markers, etc.

Filters also have a "cnctr" variable, which is a pointer to a Connector. This pointer is set up when the filter chain is created and it does not change. The only thing the filter knows about the Connector is that it implements a SEND( ) function. When the filter is done processing a buffer segment, typically toward the end of its RECEIVE( ) function, it calls the connector's SEND( ) function with the buffer segment as argument. By doing this, the filter releases ownership of the buffer segment.

Each filter implements a RECEIVE( ) function, but different filters do different things and so their receive functions are different. A pseudo code outline of a typical RECEIVE( ) function follows.

```
void Filter::receive(BufSegment* bs)
{
    // on entry we have received a buffer segment to process
    // set up a pointer to walk through the segment
    while (<there is more data in the segment>) {
        // look to see if there is an interesting string here in the
            segment
        if (<there is an interesting string right here>) {
            Marker mrk=CreateMarker(<offset in segment>,
                <length of string>);
```

```
        // save mrk and why the string is interesting in MetaData
        }
    // advance the pointer
    }
    // at this point (we've finished the loop) we're done with the segment
    cnctr→send(bs); // pass the segment on to whatever's next
}
```

Note that there is only one loop in the code for the RECEIVE( ) function. That is because the whole function gets called over and over again as buffer segments become available for processing.

The Connector is a simple object. The Connector has a "filt" pointer 710 that points to the next filter. The filt pointer 710 is setup when the filter chain is created and it never changes. The Connector implements the SEND( ) function that the Filter calls, and in pseudo code it can be represented as follows.

```
void Connector::send(BufSegment* bs)
{
    // on entry we have received a buffer segment that some filter
    // is done with
    filt→receive(bs); // give it to the next filter to process
}
```

Since the Connector is part of the proxy-cache it is under the control of the marker software, and can be programmed to do many useful things: like keeping statistics, setting priorities, etc.

The StartOff object sits at the beginning of the filter chain and calls the RECEIVE( ) function of the first filter as buffer segments are received from the origin server. It's like a Connector in that it has a "filt" pointer but it doesn't need to implement a SEND( ) function because it doesn't have a predecessor. In pseudo code it can be represented as follows.

```
void StartOff::main( )
{
    while (<there are more packets coming from the origin server>){
    // collect data from the origin server into a buffer segment
    BufSegment* bs=new BufSegment;
    // somehow bs gets filled with data from the origin server
    filt→receive(bs); // push the buffer segment into the chain
    }
    // there are no more packets coming from the origin server
    // do something to finalize the chain
}
```

Note the loop in StartOff::main( ) is over many buffer segments, while in contrast the loop in Filter::receive( ) was within a buffer segment.

The Collector sits at the end of the chain and puts the buffer segments it gets into persistent storage. It implements a SEND( ) function so the preceding filter can treat it like a Connector. That is, the preceding filter doesn't have to have a special case for being at the end of the chain. In pseudo code the Collector can be represented as follows.

```
void Collecton::send(BufSegment* bs)
{
    // on entry we have received a buffer segment that has been
    // processed through every filter in the chain
    <put bs into persistent storage>
}
```

Figure 8:
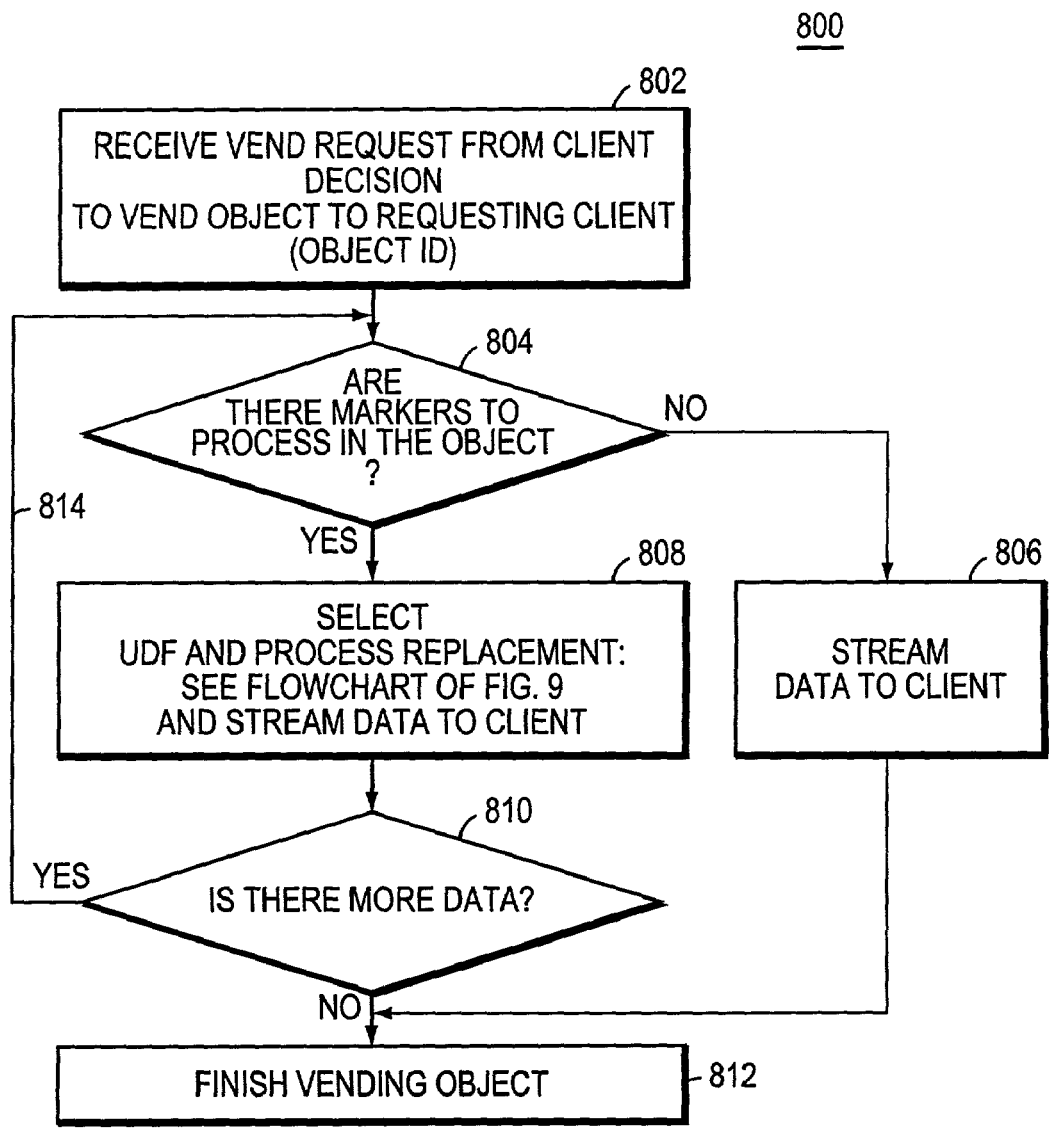
FIG. 8 is a flow chart of vending an object at vend time.

Turning now to FIG. 8, operation of the system at vend time is shown by the flow diagram of process 800. At block 802 the cache computer receives a request to vend the object. The request is tested, and a decision is made to vend the object. The object is identified by an object identification number (object ID). Upon completion of block 802, the process goes to decision block 804.

It is necessary to use both an Object ID and a request ID to identify a request because the software is written to handle concurrent requests. When multiple requests from different requestors arrive at nearly the same time at the cache computer, and they all request the same object, then the software ability to handle concurrent requests distinguishes the various requests. E.g., Browser1 and Browser2 can both request www.interesting-data.com., the proxy cache, marker software, and UDF must all distinguish the concurrent requests as different requests. For example, distinguishing the requests is important because the cache is sending data to two different network addresses. In the filtering case, the cache needs to be certain to make substitutions appropriate (by whatever criteria the UDFs apply) for the recipient. So it is necessary to use both an Object ID and a request ID to identify the operation.

At decision block 804 the process determines whether or not there are markers associated with the object which must be processed. In an exemplary embodiment of the invention, the MAT 330 stored with the data contains an entry which indicates whether or not markers associated with the object must be processed. In the event that there are no markers to process, the process goes to block 806. At block 806 the object is streamed to the client computer through line 344, and upon completion of streaming the object the process goes to block 812 to finish vending the object. In the alternative event that there are markers to process in the object, the process 800 goes to block 808.

At block 808 process 800 both selects a UDF 348, if any is required, and makes the substitutions required by both tables MAT 330 and the substitution table 352. Once the substitutions are made, the data is streamed to the client computer. Upon completion of block 808, the process goes to decision block 810.

At decision block 810 the process determines whether or not all data of the object have been streamed to the client. In the event that all data of the object have been streamed, the process 800 goes to block 812 and finishes the vend operation.

In the alternative event that decision block 810 determines that there is more data in the object to vend, the process 800 returns along path 814 to block 804 where more data is made available. The process 800 then checks with decision block 804, and the process 800 repeats.

Figure 9:
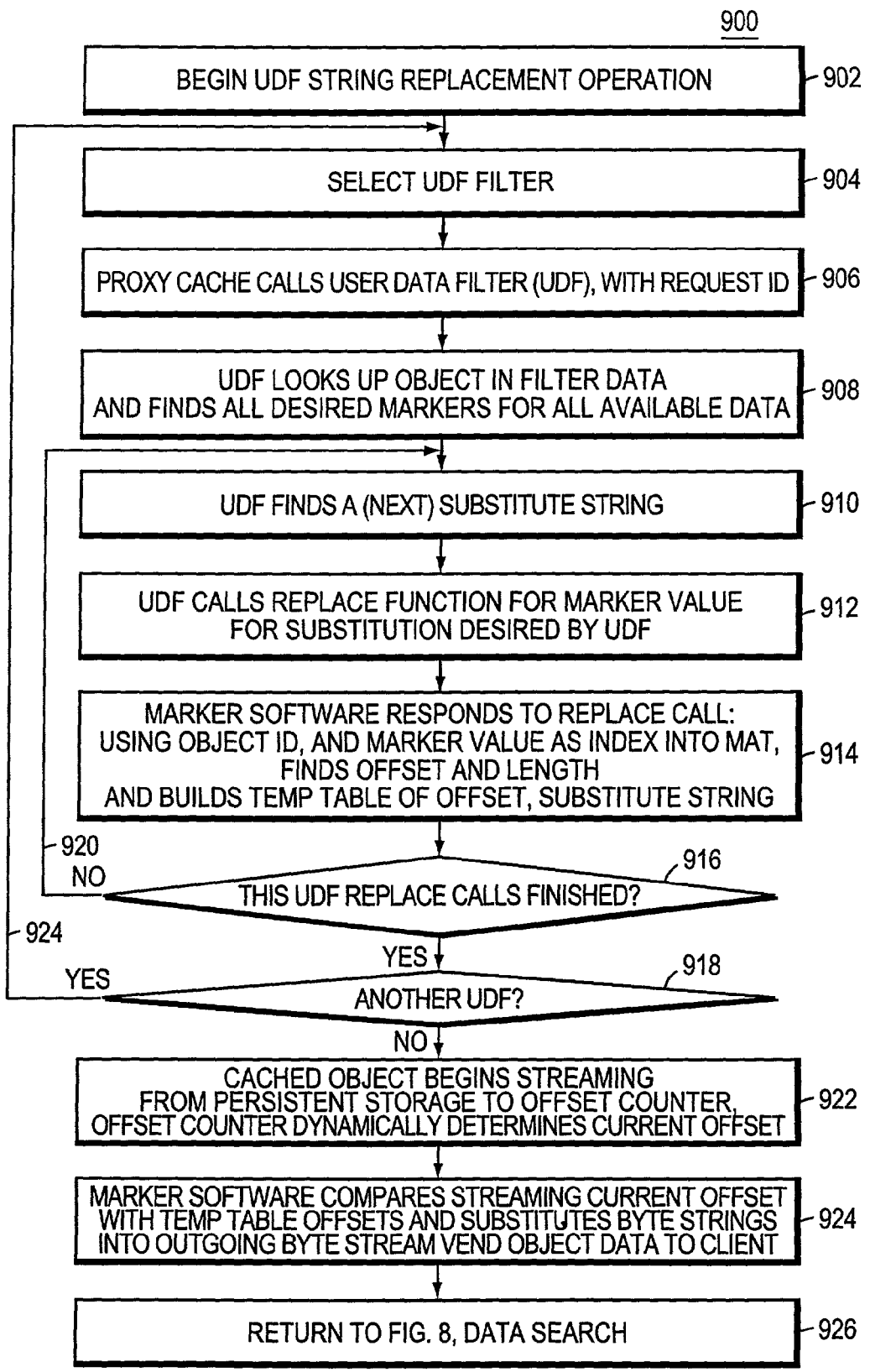
FIG. 9 is a more detailed flow chart of vending an object at vend time.

Turning now to FIG. 9, flow chart 900 shows detail within block 808 as the UDF 348 manages substitution of strings into the object at vend time. Substitution of strings refers to deleting the interesting string found by a filter, and substituting therefore the substitute string found in substitution table 352.

As noted in the discussion of FIG. 3, the vend time can be after the object has been written to persistent storage 322, or vend time can be substantially concurrent with fill time. From the UDF 348 point of view, there is no difference in whether vend time is after the object has been written to persistent storage 322, or the vended object is streamed out from the cache computer along line 344 as it is being received by the cache computer along line 302.

Flow chart 900 describes use of the REPLACE function call by filter software to omit the interesting string found by a filter as shown by an entry in MAT 330, and to have the operating system software substitute the substitute string from substitute table 352. At block 902 a vend request triggers the beginning of a UDF string replacement operation. From block 902 the process goes to block 904.

At block 904 the process selects a UDF filter 348. From block 904 the process goes to block 906.

At block 906 filter software issues a CALL for a user data filter UDF 348, with a request identification (Request ID) as a parameter of the call. The Request ID includes an object identification, and an identification of the request being responded to in order to distinguish between requests which may be processed concurrently. The process then goes to block 908.

At block 908 the markers software responds to the CALL function call and looks up in the MAT 330 stored with the object, all of the desired markers for the available data. From block 908 the process goes to block 910.

At block 910 the process finds the next substitute string needed as the data stream to the client. The next substitute string depends upon the current byte count as the data streams to the client computer, and the value of the next offset read from table MAT 330. From block 910 the process goes to block 912.

At block 912 the UDF filter software calls the REPLACE function. Input parameters of the REPLACE function include the marker identification number of the next substitution, and the substitution string or a pointer to it. From block 912 the process goes to block 914.

At block 914 the response of the markers operating system software to the REPLACE function is shown. The markers operating system software responds to the REPLACE function call by doing the following.

1. Uses the object identification number and marker value as an index into the MAT table 330, finds the offset and length for the next substitution.
2. Builds a temporary table of offset and substitute string for the substitutions.

Upon completion of block 914, the process goes to decision block 916.

At decision block 916 the process asks if all REPLACE calls for this UDF 348 are finished. In the event that all REPLACE calls have been finished, the process goes to decision block 918. In the contrary event, that not all REPLACE calls are finished, the process goes along path 920 to block 910, where the UDF 348 finds the next substitution, and process 900 repeats.

At decision block 918 the filters applications software tests to determine if any more UDF filters 348 are to be used. In the event that there are no more UDF 348 filters to use, the process goes to block 922 In the event that there are more UDF filters to use for vending this object at this vend time, the process returns along path 924 to block 904, where the next UDF 348 filter is selected.

At block 922 the cached object begins streaming to offset counter 360. Offset counter 360 counts the bytes which have streamed to the client computer. Process 900 then goes to block 924.

At block 924 the marker, operating system, software compares the byte count determined by the offset counter 360 with the next offset stored in MAT 330. In the event that the current, counted, offset matches an offset read from MAT 330, then the substitute string of bytes read from substitute table 352 are substituted for the interesting string identified by its offset and length. The substituted byte stream is then streamed to the client through block 342 and out along line 344. From block 924 the process goes to block 926.

At block 926 the function 900 returns to block 808 of FIG. 8, so that decision block 810 can determine if there is more data to examine.

Figure 10:
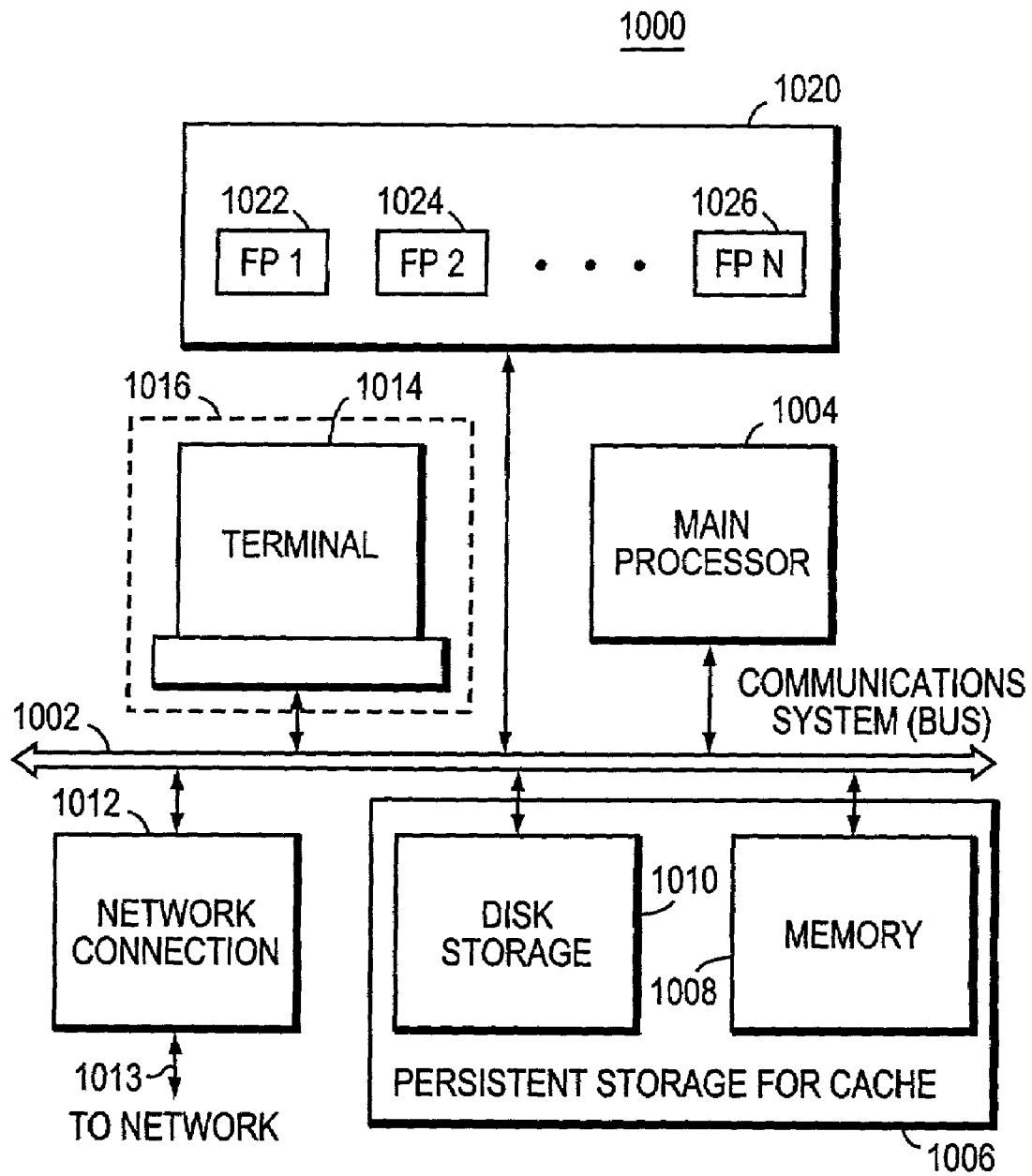
FIG. 10 is a block diagram of a typical computer used for a cache computer.

Turning now to FIG. 10, a block diagram of a typical computer 1000 used as a cache computer is shown. Communication system 1002 provides communication between the various hardware components of the computer 1000. Communications system 1002 is typically a bus, however in high performance systems communications system 1002 may be a cross bar switch, etc. Main processor 1004 executes the principal code of the cache computer. FIG. 2 gives a typical block diagram of an operating system for computer 1000, and the operating system of FIG. 2 executes on processor 1004.

Persistent storage unit 1006 includes the memory 1008 and a disk storage unit 1010 of computer 1000. Network connection unit 1012 connects computer 1000 to a computer network through connection line 1013, such as the computer network 100 shown in FIG. 1.

Terminal 1014 is shown in a dotted box 1016 because a terminal is often not used by a server computer. In some cases, for ease of operation a terminal is used. When a terminal is not used, the computer is controlled through network connection 1012 by control messages received through network connection 1013.

Filter processors FP1 1022, FP2 1024, . . . FPN 1026, etc. are shown in box 1020. Filter processors FP1 1022, FP2 1024, . . . FPN 1026 are optional, as the concurrent processing may be done by a fast main processor 1004. However, in a high throughput design, it may be preferable to supply a separate filter processor for each filter. For example, filter 1 310A could execute using filter processor FP 11022, filter 2 310B could execute on filter processor 1024, etc. The filter processors could be programmable processors with their own coupled memory for independent and concurrent operation, or alternatively, the filter processors could be hardwired chips designed especially as filter processors, etc. Alternatively, all of the concurrent processing by the filters can be programmed to run on main processor 1004 using a multiprocessor type of operating system 202.

It is to be understood that the above described embodiments are simply illustrative of the principles of the invention. Various other modifications and changes may be made by those skilled in the art which embody the principles of the invention and fall within the spirit and scope thereof.

What is claimed is:

1. A method for operating a cache, comprising:

naming an interesting string in an object received by the cache, to provide a name for said interesting string;

saving an offset and a length of said interesting string under said name; and, counting bytes of the object as it is streamed to a client computer, and when a byte count matches said offset, omitting said interesting string and substituting therefore a substitute string within data content associated with the object while that data is being streamed in sequence to said client computer, and wherein the substitute string appears within the data content at the offset.

2. The method as in claim 1, wherein said naming step further comprises:

locating said interesting string by applications software;

executing, by applications software, a CREATE function to create a marker for said interesting string, said CREATE function returning to said applications software a return value, and said CREATE function writing said offset and said length into a marker attribute table with an object identification; and, using, by said applications software, said return value as said name.

3. The method as in claim 2, further comprising:

writing said return value into said marker attribute table as said name.

4. The method as in claim 2, further comprising:

saving said object and the marker attribute table to persistent storage.

5. The method as in claim 2, further comprising:

writing said object and said marker attribute table to persistent storage;

receiving, in a REPLACE call, a name of an interesting string;

reading, at vend time, said object and said marker attribute table from said persistent storage, said name indicating in said marker attribute table an offset and a length of said interesting string; and, replacing said interesting string indicated by said name, by a substitute string provided in the REPLACE call as the object is streamed onto a computer network.

6. The method as in claim 5, further comprising:

preserving a relationship between said name and said interesting string in the event that the computer has been shut down and restarted.

7. The method as in claim 1, further comprising:

selecting, in response to one or more of said name, one or more desired interesting strings; and, performing said omitting and substituting steps for said desired interesting strings, and not for other said interesting strings.

8. The method as in claim 1, further comprising:

arranging said interesting string as a place marker in a web page, said web page saved as said object; and, substituting said substitute string for said place marker.

9. The method as in claim 8 further comprising:

selecting said substitute string in response to a characteristic of a request message, said request message requesting vending said object.

10. The method as in claim 1, further comprising:

establishing said method as operating system software, and providing system calls for applications software to use to execute steps of said method as operating system actions.

11. The method as in claim 1, further comprising:

saving said object to persistent storage.

12. The method of claim 11, further comprising:

receiving a request to vend said object;

determining, in response to one or more characteristics of said request, which said interesting strings to substitute, determined interesting string, by substitute strings; and, selecting, in response to one or more characteristics of said request, which substitute string to use in substituting for said determined interesting string; and, vending said object with said substitute strings inserted therein.

13. A computer readable media having instructions written thereon for execution in a processor for the practice of the method of claim 1.

14. A cache computer, comprising:

a process to name an interesting string in an object received by the cache, to provide a name for said interesting string;

a data structure to save an offset and a length of said interesting string under said name; and, an out control to count bytes of the object as it is streamed to a client computer, and when a byte count matches said offset, deleting said interesting string and substituting therefore a substitute string within data content associated with the object as that data content is being streamed in sequence to said client computer, and wherein the substitute string appears at the offset within the data content.

15. The cache computer as in claim 14, further comprising:

a first process in applications software to locate said interesting string;

a second process to execute, by said applications software, a CREATE function to create a marker for said interesting string, said CREATE function returning to said applications software a return value, and said CREATE function writing said offset and said length into a marker attribute table with an object identification; and, a third process to use, by said applications software, said return value as said name.

16. The cache computer as in claim 15, further comprising:

a persistent storage for saving said object and said marker attribute table.

17. The cache computer as in claim 15, further comprising:

a persistent storage for saving said object and said marker attribute table;

a replace process to receive, in a REPLACE call, a name of an interesting string;

a read process to read, at vend time, said object and said marker attribute table from said persistent storage, said marker attribute table indexed by said name to give an offset and a length of said interesting string; and, a replace process to replace said interesting string indicated by said name, by a substitute string provided in the REPLACE call as the object is streamed onto a computer network.

18. The cache computer as in claim 17, further comprising:

means for preserving a relationship between said name and said interesting string in the event that the computer has been shut down and restarted.

19. The cache computer as in claim 14, further comprising:

a process to associate a request identification with a substitution table in order to distinguish different requests for said object.

20. The cache computer as in claim 14, further comprising:

a process to select, in response to one or more of said name, by said applications software one or more desired interesting strings; and, a process to perform said omitting and substituting steps for said desired interesting strings, and not for other said interesting strings.

21. The cache computer as in claim 14, further comprising;

a process to arrange said interesting string as a place marker in a web page, said web page saved as said object; and, a process to substitute said substitute string for said place marker.

22. The cache computer as in claim 14, further comprising:

a process to select said substitute string in response to a characteristic of a request message, said request message requesting vending said object.

23. The cache computer as in claim 14, further comprising:

an operating system to execute steps of said method as operating system software, and providing system calls for applications software to use to execute steps of said method as operating system actions.

24. The cache computer as in claim 14, further comprising:

persistent storage to save said object.

25. The cache computer of claim 24, further comprising:

a process to vend said object at a time later than storage of said object to said persistent storage;

a receiver in a network connection to receive a request to vend said object;

a process to determine, in response to one or more characteristics of said request, which said interesting strings to substitute, determined interesting string, by substitute strings; and, a process to select, in response to one or more characteristics of said request, which substitute string to use in substituting for said determined interesting string.

26. A cache computer, comprising:

means for naming an interesting string in an object received by the cache, to provide a name for said interesting string;

means for saving an offset and a length of said interesting string under said name; and, means for counting bytes of the object as it is streamed to a client computer, and when a byte count matches said offset, deleting said interesting string and substituting therefore a substitute string within data content associated with the object as that data is being streamed in sequence to said client computer, and wherein the substitute string appears at the offset within the data content.

\* \* \* \* \*

UNITED STATES PATENT AND TRADEMARK OFFICE
CERTIFICATE OF CORRECTION

| | | |
|---|---|---|
| PATENT NO. | : 7,680,875 B1 | Page 1 of 1 |
| APPLICATION NO. | : 10/113235 | |
| DATED | : March 16, 2010 | |
| INVENTOR(S) | : Shopiro et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2051 days.

Signed and Sealed this
Eleventh Day of January, 2011

David J. Kappos
*Director of the United States Patent and Trademark Office*